United States Patent
Wouldhave et al.

(10) Patent No.: US 10,030,166 B2
(45) Date of Patent: Jul. 24, 2018

(54) COATING COMPOSITION

(71) Applicant: Akzo Nobel Coatings International B.V., Arnhem (NL)

(72) Inventors: Matthew Wouldhave, Tyne and Wear (GB); Bijoy Kanatt, Bangalore (IN); Sebastiaan J. A. Hesselink, Durham (GB); Michael David Donkin, Tyne and Wear (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 31 days.

(21) Appl. No.: 15/023,969

(22) PCT Filed: Oct. 1, 2014

(86) PCT No.: PCT/EP2014/070998
§ 371 (c)(1),
(2) Date: Mar. 22, 2016

(87) PCT Pub. No.: WO2015/049260
PCT Pub. Date: Apr. 9, 2015

(65) Prior Publication Data
US 2016/0244635 A1    Aug. 25, 2016

(30) Foreign Application Priority Data

Oct. 4, 2013 (EP) .................... 13187324

(51) Int. Cl.
| | | |
|---|---|---|
| *C09D 175/02* | (2006.01) | |
| *F03D 1/06* | (2006.01) | |
| *C08G 18/50* | (2006.01) | |
| *C08G 18/60* | (2006.01) | |
| *C08G 18/79* | (2006.01) | |
| *C09D 175/12* | (2006.01) | |
| *C08G 18/46* | (2006.01) | |

(52) U.S. Cl.
CPC ....... *C09D 175/02* (2013.01); *C08G 18/4623* (2013.01); *C08G 18/5024* (2013.01); *C08G 18/603* (2013.01); *C08G 18/792* (2013.01); *C09D 175/12* (2013.01); *F03D 1/0675* (2013.01); *F05B 2230/90* (2013.01); *F05B 2260/95* (2013.01); *F05B 2280/6011* (2013.01); *Y02E 10/721* (2013.01); *Y02P 70/523* (2015.11)

(58) Field of Classification Search
CPC ........... C08G 18/4623; C08G 18/5024; C08G 18/603; C08G 18/792; C09D 175/02; C09D 175/12; F03D 1/0675; F05B 2230/90; F05B 2260/95; F05B 2280/6011; Y02E 10/721; Y02P 70/523
USPC ....... 524/590; 428/423.1; 416/132 B, 229 A; 290/55
See application file for complete search history.

(56) References Cited

U.S. PATENT DOCUMENTS

| | | | |
|---|---|---|---|
| 5,922,398 A | 7/1999 | Robertson et al. | |
| 2005/0271881 A1* | 12/2005 | Hong .................... | B82Y 30/00 428/423.1 |
| 2006/0116488 A1 | 6/2006 | Baumgart et al. | |
| 2006/0135678 A1 | 6/2006 | Kato et al. | |
| 2010/0183901 A1* | 7/2010 | Van Ginneken et al. ........ | C09D 5/20 428/704 |
| 2011/0003913 A1* | 1/2011 | Duijghuisen et al. . | C08G 18/10 523/435 |
| 2017/0015862 A1* | 1/2017 | Wouldhave ............. | C09D 5/00 |

FOREIGN PATENT DOCUMENTS

| | | |
|---|---|---|
| EP | 1462487 | 9/2004 |
| JP | S61180924 | 8/1986 |
| JP | 2012-502170 A | 1/2012 |
| KR | 20070023545 | 2/2007 |
| WO | 2006/055038 | 5/2006 |
| WO | 10/030544 A1 | 3/2010 |

OTHER PUBLICATIONS

International Search Report and Written Opinion dated Jan. 9, 2015 for International Application No. PCT/EP2014/070998 filed Oct. 1, 2014.

* cited by examiner

*Primary Examiner* — Thao T Tran
(74) *Attorney, Agent, or Firm* — McDonnell Boehnen Hulbert & Berghoff LLP

(57) ABSTRACT

A coating composition comprising: a) a film forming resin comprising secondary amine groups, b) a polyisocyanate curing agent and c) solid particles of an amino resin based polymer.

12 Claims, No Drawings

COATING COMPOSITION

This application is the US national phase of international application PCT/EP2014/070998, filed Oct. 1, 2014.

The invention relates to protective coating compositions which have a low VOC (less than 250 g/l), are fast drying, and excellent erosion resistance. These coating compositions are particularly suitable for use in coating wind blades.

Wind power is the conversion of wind energy into a useful form, such as electricity, using wind turbines. Wind power is produced in large scale wind farms connected to electrical grids, as well as in individual turbines for providing electricity to isolated locations. Wind turbines typically have 2 to 4 large blades which are designed to last around 20 to 25 years. Wind turbine blades, or "wind blades" are constantly exposed to the elements and are ideally designed to endure temperature extremes, wind shears, precipitation, and/or other environmental hazards with minimal failure. Coating failure due to erosion is often observed on the leading edge of the blade. The "leading edge" of the blade will be understood as referring to the portion of the blade that first cuts into the wind, while the trailing edge is the opposite edge. The leading edge is typically subjected to environmental factors such as salt, sand, dirt and other particulates causing dry abrasion, as well as wet environmental factors such as wind, rain, snow and the like. Accordingly, accelerated coating failure and/or erosion may be observed on the leading edge.

Protective coatings for use on wind blades must therefore meet very stringent criteria in order for them to last their life time of around 20-25 years. A water droplet changes its shape considerably during collision with a substrate such as a wind blade. Most of the time the rain drop produces a ripple like shock waves on the surface of the paint film with a small damage at it's epicentre. For a coating on a wind blade to survive the multiple collisions of rain droplets for long time, the coating film should have good adhesion to the substrate and good resilience properties.

Current leading market products for coating wind blades are polyester based polyurethanes. Whilst these coating products have reasonable adhesion and resistance properties, they all have a high Volatile Organic Content (VOC) of greater than 250 g/l, and often dry slowly at ambient temperature. To increase the rate which these coatings dry, they may be heated in an air oven. Further, multiple coatings of the polyurethane coatings are often required on the wind blade to achieve the required rain erosion protection. The application of multiple coatings to a wind blade takes time and is costly. In contrast, the coating composition of the present invention are capable of being applied to substrates easily in one coat, with minimal substrate surface preparation, and this coat provides good rain erosion protection.

Coating compositions comprising polyurea type resins, for example compositions formed from polyaspartic ester amines and isocyanate curing agents are known in the protective coatings industry. However, the erosion resistance of such coatings are not known to be as good as the commercially leading polyester based polyurethane systems. Surprisingly, the inventors have found that when amino resin based polymer is added to a polyurea coating system, the erosion resistance of the coating is dramatically improved to the extent that the coatings of the present invention provide resistance to erosion which is at least as good as the leading polyester based polyurethane coating systems. However not only do the polyurea coatings of the present invention provide good resistance to erosion, but advantageously they also have a lower VOC than the leading polyester based polyurethane coating systems. Further, the coating composition of the present invention is capable of providing the same protection in less coating layers (e.g. just one coating layer), and is capable of being applied using standard techniques. The coatings of the present invention are capable of providing protection in the particularly harsh rain erosion conditions experienced by wind turbine blades.

The present invention provides a coating composition having a low VOC (preferably less than 250 g/l), short dry time in ambient conditions (preferably less than 3 hours at 50% RH and 25° C.), a good pot life (e.g. 90 min @ 25° C. or longer), and can be applied easily using standard techniques. Further, the coating provides superior erosion protection, in particular rain erosion protection, compared to known polyurea based coating systems, which is achievable in just one coating layer.

SUMMARY OF THE INVENTION

The present application relates to a coating composition comprising:
  a) a film forming resin comprising secondary amine groups,
  b) a polyisocyanate curing agent and
  c) solid particles of an amino resin based polymer.

Preferably (a) and (b) are present in the coating composition in an amount so that the stoichiometric ratio of isocyanate groups:secondary amine groups is 1.0:1.0 to 2.5:1.0.

The film forming resin comprising secondary amine groups may be a polyaspartic ester amine.

The amino resin based polymer may be a methyl urea based polymer. The amino resin based polymer may be a crosslinked polymer. The solid particles of an amino resin based polymer are generally present in an amount of 1 to 25% by weight, based on the weight of the total coating composition.

The polyisocyanate curing agent may have an isocyanate equivalent weight of between 280 g/eq to 840 g/eq, for example between 280 g/eq to 500 g/eq.

The film forming resin comprising secondary amine groups may have an amine equivalent weight of between 150 g/eq and 450 g/eq.

Preferably, (a) and (b) are present in the coating composition in an amount so that the stoichiometric ratio of isocyanate groups:secondary amine groups is greater than 1.2:1.0, greater than 1.3:1.0, and preferably greater than 1.5:1.0 to a maximum ratio of 2.5:1.0.

The present invention makes use of known polyaspartic ester amines. In one embodiment the polyaspartic ester amine has the following general structure:

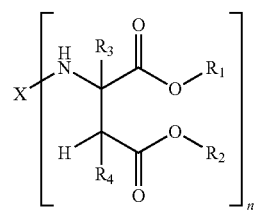

wherein X represents an alicylic hydrocarbon which is inert towards isocyanate groups at temperatures of up to 100° C.;

$R_1$ and $R_2$ are each independently selected from organic groups which are inert toward isocyanate groups at temperatures of up to 100° C.;

$R_3$ and $R_4$ each are independently selected from hydrogen and organic groups which are inert towards isocyanate groups at temperatures of up to 100° C.; and n is an integer of at least 2.

Typically the coating composition is provided in two packs, a first pack comprising the polyaspartic ester amine and a second pack comprising the polyisocyanate curing agent.

The present invention also relates a method of protecting a substrate against erosion (e.g. rain erosion or solid particle erosion) by
providing a coating composition as described herein (e.g. a coating composition comprising a film forming resin comprising secondary amine groups, a polyisocyanate curing agent and solid particles of an amino resin based polymer),
applying the coating composition to the substrate to form one or more coating layer(s) on the substrate, and
allowing the coating layer(s) to harden/cure on the substrate at ambient temperature.

The coating composition of the present invention may be applied at a thickness of from about 100 μm to about 300 μm, for example, in just one coat.

The substrate may be a wind blade or a part thereof. Erosion may be solid particle erosion or rain erosion. A coating composition that is capable of hardening/curing at ambient temperature is a coating composition that requires no artificial heating to effect curing/hardening. The coating composition of the present invention is therefore capable of curing to form a coating film on a substrate once it has been applied with no additional heating. Ambient temperature is also typically known in the art to be temperatures ranging from 0° C. to 30° C.

The present invention also relates to coated substrate, for example a wind blade or a part thereof, wherein the substrate is coated with the coating composition described herein.

The present invention also relates to the use of solid particles of an amino resin based polymer in a coating composition for improving the rain erosion resistance or solid-particle erosion resistance of a coating formed from the coating composition.

An improvement in rain erosion resistance is measurable in accordance with ASTM G73-10. An improvement in erosion resistance to solid particles is measurable in accordance with ASTM G76 for Particle Erosion Test.

DETAILED DESCRIPTION OF THE INVENTION

A Film Forming Resin Comprising Secondary Amine Groups (a)

Suitable examples of film forming resins comprising secondary amine groups include for example aliphatic polyester amines, aliphatic polyether amines, and polyaspartic ester amines.

Preferably the number average molecular weight of the film forming resins comprising secondary amine groups ranges between 500 to 1200 g/mol, for example 550 to 900 g/mol. The molecular weight can be measured by GPC in accordance with ISO 13885-1: 2008.

The film forming resin comprising secondary amine groups may have an amine equivalent weight of between 150 g/eq and 450 g/eq, for example 200-350 g/eq.

The Amine equivalent weight is calculated from Amine value as per the following formula:

Amine equivalent=56.1×1000/[Amine value],
wherein the Amine value can be determined in accordance with ASTM D 2074.

Preferred film forming resins comprising secondary amine groups are polyaspartic ester amines such as those described in U.S. Pat. No. 5,126,170 and correspond to the general formula (I)

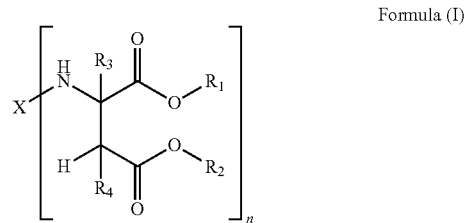

Formula (I)

wherein X represents an alicyclic hydrocarbon which is inert towards isocyanate groups at temperatures of up to 100° C.;

$R_1$ and $R_2$ are each independently selected from organic groups which are inert toward isocyanate groups at temperatures of up to 100° C.;

$R_3$ and $R_4$ each are independently selected from hydrogen and organic groups which are inert towards isocyanate groups at temperatures of up to 100° C.; and n is an integer of at least 2.

For example, X may be an alicyclic hydrocarbon comprising 6 to 20 carbon atoms. Preferably X represents a divalent hydrocarbon group obtained by the removal of the amino groups from 1,4-diaminobutane, 1,6-diaminohexane, 2,2,4- and 2,4,4-trimethyl-1,6-diaminohexane, 1-amino-3,3,5-trimethyl-5-aminomethyl-cyclohexane, 4,4'-diamino-dicyclohexyl methane or 3,3-dimentyl-4,4'-diamino-dicyclohexyl methane.

Preferably n is 2.

Preferably $R_1$ and $R_2$ represent $C_1$-$C_6$ alkyl groups for example methyl or ethyl groups. Preferably $R_3$ and $R_4$ represent hydrogen.

Polyaspartic ester amines may be prepared by reacting one or more cyclic polyamine(s) comprising primary amine groups with an unsaturated dialkyl ester, as described in described in U.S. Pat. No. 5,126,170.

The cyclic polyamine component comprising more than one primary amine group, which is used to make the polyaspartic ester, typically comprises 6-25 carbons, and contains at least one alicyclic ring. Examples of suitable alicyclic diamine components include 1,3-diaminocyclohexane, 1,4-diaminocyclohexane, 1,6-diaminocyclohexane, 2,2,4- and 2,4,4-trimethyl-1,6-diaminohexane, 1-amino-3,3,5-trimethyl-5-aminomethylhexane and preferably bis(aminomethyl)cyclohexanes including 1,3-bis(aminomethyl)cyclohexane, 1,4-bis(aminomethyl)cyclohexane, isophoronediamine, bis(4-aminocyclohexyl)methane, bis(4-aminocyclohexyl)propane, 4,4-diamino-3,3-dimethyldicyclohexylmethane, 4,4-diamino-3,3-dimethyldicyclohexylpropane, 4,4-diamino-3,3-dimethyl-5,5-dimethyl dicyclohexylmethane, 4,4-diamino-3,3-dimethyl-5,5-dimethyldicyclohexylpropane, The unsaturated dialkyl ester, which is used to make the polyaspartic ester, is preferably butenedioic acid diethyl ester, for example an ester of maleic acid or fumaric acid, for example dimethyl, diethyl, dipropyl and di-n-butyl esters of maleic and fumaric acid.

Alternatively, the polyaspartic ester may correspond to the general formula (I), however wherein X is an aliphatic divalent hydrocarbon group comprising 5-10 carbon atoms and $R_1$, $R_2$, $R_3$, $R_4$ and n are the same as defined above.

For example, X may represent a divalent hydrocarbon group obtained by the removal of the amino groups from 2-methylpentane diamine or hexanediamine.

The polyaspartic ester may be prepared by reacting one or more aliphatic polyamine(s) comprising primary amine groups with an unsaturated dialkyl ester (as described above).

An example of a polyaspartic ester which can be used in the present invention is Desmophen® NH1420 (ex Bayer Material Science AG).

As mentioned previously, other suitable examples of film forming resins comprising secondary amine groups include for example aliphatic polyester amines and aliphatic polyether amines. Commercial examples of aliphatic polyethermines include JEFFAMINE® SD-secondary polyether amines such as JEFFAMINE® SD-231 amine, JEFFAMINE® SD-401 amine, JEFFAMINE® SD-2001 amine all from Huntsman Corporation.

(b) The Polyisocyanate Curing Agent

The polyisocyanate curing agent may be one or more polyisocyanate curing agents.

The isocyanate equivalent weight of the one or more polyisocyanate curing agents may range between 280 g/eq to 1500 g/eq, for example 280 g/eq to 1200 g/eq, or 280 g/eq to 840 g/g.

By isocyanate equivalent weight ("NCO eq. wt") we mean the number of grams of a product needed for one equivalent of isocyanate ("NCO") reactive groups.

Isocyanate equivalent weight (g/eq)=4,200/[weight % of NCO in the polyisocyanate]. For example, for a known polyisocyanate curing agent having a weight % of NCO of 10, the calculated isocyanate equivalent weight is 4,200/10=420 g/eq. The isocyanate group content of the polyisocyanate component is measurable by titration using di-n-butylamine in accordance with ASTM D2572-87.

In all embodiments, the isocyanate equivalent weight may be greater than 300 g/eq, or greater than 320 g/eq, or greater than 340 g/eq.

In all embodiments, the polyisocyanate curing agent may have an isocyanate equivalent weight of less than 1500 g/eq or less than 1200 g/eq, 840 g/eq, 800 g/eq, 750 g/eq, 700 g/eq, 650 g/eq, 600 g/eq, 550 g/eq or 500 g/eq.

For example, the polyisocyanate curing agent has an isocyanate equivalent weight of 280-1500 g/eq, 280-1200 g/eq, 280-840 g/eq, 300-1500 g/eq, 300-1200 g/eq, 300-800 g/eq, 300-700 g/eq, 300-600 g/eq, 300-500 g/eq, 350-1500 g/eq, 350-1200 g/eq, 350-840 g/eq, or 350-450 g/eq.

Further, the number average molecular weight of the polyisocyanate curing agent may range between 550 to 2000 g/mol, for example 1000 to 2000 or 1200 to 1800. The molecular weight can be measured by GPC in accordance with ISO-13885-1: 2008

The one or more polyisocyanate curing agent may be selected from one or more aromatic or aliphatic polyisocyanates. Such polyisocyanates include as diisocyanates and triisocyanates including biurets and isocyanurates. It is preferred that the polyisocyanate curing agent comprises at least one aliphatic polyisocyanate curing agent. Preferably the aliphatic polyisocyanate is based on hexamethylene diisocyanate.

Diisocyanates include toluene diisocyanate, 4,4'-methylene-bis(cyclohexyl isocyanate), isophorone diisocyanate, an isomeric mixture of 2,2,4- and 2,4,4-trimethyl hexamethylene diisocyanate, 1,6-hexamethylene diisocyanate, tetramethyl xylylene diisocyanate and/or 4,4'-diphenylmethylene diisocyanate.

Biurets of diisocyanates include 1,4-tetramethylene diisocyanate and 1,6-hexamethylene diisocyanate, as well as of cycloaliphatic diisocyanates such as isophorone diisocyanate and 4,4'-methylene-bis-(cyclohexyl isocyanate). Examples of aralkyl diisocyanates from which biurets may be prepared are meta-xylylene diisocyanate and alpha.,.alpha.,.alpha.',.alpha.'-tetramethylmeta-xylylene diisocyanate.

Trifunctional isocyanates include trimers of isophorone diisocyanate, triisocyanate nonane, triphenylmethane triisocyanate, 1,3,5-benzene triisocyanate, 2,4,6-toluene triisocyanate, and isocyanurates of hexamethylene diisocyanate. Specifically used polyisocyanates are alicyclic isocyanates, particularly, isocyanurates of diisocyanates such as hexamethylene diisocyanate and isophorone diisocyanate.

The polyisocyanate curing agent may be one or more polyisocyanate pre-polymers. Polyisocyanate pre-polymers are known in the art. They are discrete molecules produced by reaction of a polyol with an excess of diisocyanate monomers. An example of suitable polyisocyanate pre-polymers for use in the present invention are polyisocyanate pre-polymers of hexamethylene diisocyanate. Such suitable polyisocyanate prepolymers can be obtained commercially, for example, Desmodur® N3800 and Desmodur® E3370 from Bayer Corporation. Desmodur® N3800 is an aliphatic polyisocyanate (HDI isocyanurate trimer) with a NCO content of 11±0.5% (isocyanate equivalent weight=4,200/11=382 g/eq). Desmodur® E3370 is an aliphatic polyisocyanate prepolymer also based on hexamethylene diisocyanate with a NCO content of 10.0±0.5% (isocyanate equivalent weight=4,200/11=400 g/eq). These polyisocyanate prepolymers can be used alone or in combination with one another.

The Stoichiometric Ratio of Isocyanate Groups to Secondary Amino Groups

A "1:1 stoichiometric ratio" of isocyanate groups to secondary amino groups, is to be understood in it's normal way: that there is an equal number of isocyanate groups to secondary amino groups.

The film forming resin comprising secondary amine groups (e.g. polyaspartic ester amine) and the polyisocyanate curing agent is preferably present in the coating composition in an amount so that the stoichiometric ratio of isocyanate groups (NCO):secondary amine groups ($NR_2H$) is 1.0:1.0 to 2.5:1.0. (i.e. 1.0 to 2.5 isocyanate groups to every 1.0 secondary amine group).

Components (a) and (b) may be present in the coating composition in an amount so that the stoichiometric ratio of isocyanate groups:secondary amine groups is greater than 1.3:1.0, greater than 1.4:1.0, greater than 1.5:1.0 and suitably greater than 1.6:1.0, up to a maximum stoichiometric ratio of 2.5:1.0.

The stoichiometric ratio of isocyanate groups:secondary amine groups may be a maximum of 2.4:1.0, 2.3:1.0, 2.2:1.0, 2.1:1.0 or 1.9:1.0.

(c) Solid Particles of an Amino Resin Based Polymer

The coating composition comprises solid particles of an amino resin based polymer.

The solid particles of an amino resin based polymer may be present in the coating composition in an amount of at least 1, or at least 2, or even at least 4% by weight, calculated on the total weight of the coating composition. The upper limit of the amount of the particles suitably is 25%, or 20%, or 14% by weight, calculated on the total weight of the composition. The average particle size generally is in the range of 1 μm to 150 μm. The particles used generally have a particle size distribution. For example, 90% of all particles may be smaller than 14 μm, and 50% of all particles may be smaller 6.5 μm. Particle size is measurable by a Laser Diffraction, for example by using a Horiba laser diffraction particle size analyzer.

The lateral dimension and the longitudinal dimension of the particles may be of a similar order. The particles may for example be essentially of spherical shape. However, the particles may also have other shapes, for example a platelet shape or a needle shape.

The amino resin based polymer can suitably be prepared by condensation reactions of amino resins or amino resin precursors with formaldehyde or by other condensation and/or addition reactions of amines. Examples of suitable amino resin based polymers are guanidine based polymers, melamine based polymers, urethane based polymers, amide based polymers, and urea based polymers, in particular methyl urea based polymers. The amino resin based polymer suitably is crosslinked, i.e. the polymer is a duroplast. Crosslinking can occur in the condensation reaction of the amino resin with formaldehyde. However, crosslinking can also be caused by additional crosslinking agents. Suitable solid particles of amino resin based polymer are commercially available, for example under the trade designation Deuteron® MK ex Deuteron GmbH, Germany. The Deuteron® MK particles are based on methyl urea polymer.

(iv) Solvents

The coatings compositions typically comprise solvent. Examples of solvents that may be used include for example xylene, aliphatic white spirit solvent, mineral spirits, ketonic solvents such as the following $C_3$-$C_8$ ketonic solvents: methyl isopentyl ketone, methyl n-butyl ketone, methyl isobutyl ketone, methyl ethyl ketone, diethyl ketone and acetone, and ester solvents such as the following acetate esters: ethyl acetate, propyl acetate, butyl acetate and 1-methoxy-2-propyl acetate. One or more solvents may be used in the coating composition.

(v) Other Components in the Coating Composition

The coating composition may also includes a variety of other fillers and additives, for example, pigments, extender pigments, colouring agents, pigment dispersants, corrosion inhibitors, reinforcing agents, rheology-controlling agents, levelling agents, fatting agents, wetting agents, anti-cratering agents, anti-foaming agents, biocides, accelerators, surfactants, (organic) solvents, plasticizers, light stabilizers, UV light absorbers (e.g. Tinuvin® 292), moisture scavengers, antioxidants and odour masking agents.

A filler is a solid, solvent insoluble material, often employed to add bulk volume or to extend the pigments capabilities without impairing the reactive chemistry of the coating mixture (e.g. pigments and extender pigments). Fillers are may be employed at a concentration of 2 to 30 wt % of the total weight of the coating composition.

Fillers may also be included to inhibit corrosion or provide strength. Examples of fillers include finely divided minerals such as barium sulfate, silica, including fumed silica and/or colloidal silica, alumina, kaolin, colloidal alumina, titanium dioxide, zirconia, colloidal zirconia, clay, mica, dolomite, talc, magnesium carbonate, calcium carbonate, calcium sulfate, calcium silicate, and/or calcium metasilicate. Other fillers include ceramic microspheres & hollow polymeric microspheres such as those available from Akzo Nobel under the trade name Expancel®, and hollow glass microspheres (such as those commercially available from 3M Company, St. Paul, Minn., under the trade designation "K37"™).

The coating composition may include a colorant. As used herein, the term "colorant" means any substance that imparts color and/or other opacity and/or other visual effect to the composition. The colorant can beaded to the coating in any suitable form, such as discrete particles, dispersions, solutions and/or flakes. A single colorant or a mixture of two or more colorants can be used in the coatings of the present invention.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art. Colourant may be incorporated by using stainers/colour concentrates.

(vi) Typical Coating Composition

A typical coating composition of the present invention comprises:
  5-30 weight % of the film forming resin comprising secondary amine groups, e.g. polyaspartic ester amine;
  20-50 weight % of the polyisocyanate curing agent, and
  5-20 weight % of the solid particles of an amino resin based polymer.

The coating composition may also comprise 5-20 weight % of aluminosilicates.

An aluminosilicate is a mineral composed of aluminium, silicon and oxygen, plus counterions. They are a major component of kaolin and other clay minerals. Andalusite, kyanite, and sillimanite are naturally occurring aluminosilicate minerals that have the composition $Al_2SiO_5$. Hydrated aluminosilicate minerals are referred to as zeolites and are porous structures that are naturally occurring materials.

Typical coating compositions of the present invention comprise:
  5-30 weight % of the film forming resin comprising secondary amine groups, e.g. polyaspartic ester amine,
  20-50 weight % of the polyisocyanate curing agent,
  5-20 weight % of the solid particles of an amino resin based polymer
  15-30 weight % of one or more pigments and/or extender pigments,
  10-30 weight % of one or more organic solvents.

Typical coating compositions may also comprise 1-10 weight % of one or more other additives that are not listed above, for example, additives for aiding wetting, dispersion, leveling, flow, absorbance of UV (e.g. Tinuvin® 292), reducing deformation and thixotropic agents (e.g. a bentonite thixotropic agent).

Unless otherwise stated, Weight % of each of the components in the coating compositions is based on the total weight of the components in the coating composition including solvent.

(vii) Method of Making the Coating Composition

The coating composition may be prepared by any suitable technique that is commonly used within the field of paint production. Thus, the various constituents may be mixed together using a high speed disperser, a ball mill, a pearl mill, a three-roll mill, bead mill, basket mill etc. The paints according to the invention may be filtered using bag filters, patron filters, wire gap filters, wedge wire filters, metal edge filters, EGLM turnoclean filters (ex Cuno), DELTA strain filters (ex Cuno), and Jenag Strainer filters (ex Jenag), or by vibration filtration.

The coating compositions of the present invention are typically provided as a two-pack composition, with the film forming resin comprising secondary amine groups, in one pack and polyisocyanate curing agent in the other pack. The solid particles of an amino resin based polymer are also typically in the package with the polyaspartic ester. Prior to application of the coating composition, the two packs are mixed together.

(viii) Application of the Coating Composition

The coating composition may be applied to the substrate by one or more of a number of methods including spraying, rolling, curtain coating, dipping/immersion, brushing, or flow coating, but they are most often applied by spraying and rolling. The usual spray techniques and equipment for air spraying and electrostatic spraying and may be manual or automatic methods. For example robotic spray methods can be used.

The coating composition is typically cured at ambient temperature. A coating composition that is capable of curing at ambient temperature is a coating composition that requires no artificial heating to effect curing. The coating composition of the present invention is therefore capable of curing to form a coating film on a substrate once it has been applied with no additional heating. Ambient temperature is also typically known in the art to be temperatures ranging from 0° C. to 30° C.

The coating composition may additionally be cured under low-bake conditions to speed up curing (for example above 30° C. to about 35° C.). An advantage of the coating composition of the present invention is that it (i) has a pot-life that enables for it to be applied using conventional techniques (e.g. standard airless/air assisted equipments), and (ii) it can cure quickly at ambient temperature. If ambient temperature curing is utilized, it is possible for the composition to cure in less than 3 hours at 50% relative humidity (50% RH) and 25° C. Often the composition cures in less than 2 hours at 50% relative humidity (50% RH) and 25° C.

Wind blades are typically made of composite materials. A "composite" will be generally understood as referring to engineering materials made from two or more different materials. Typically, the two or more materials have different, sometimes significantly different, physical and/or chemical properties. A composite typically has a matrix material and a reinforcement material; the matrix surrounds and supports the reinforcement. The composites of the present invention typically comprise a polymeric material as the matrix and a fiber as the reinforcement. The fiber can comprise, for example, glass fibers (i.e. fiberglass), carbon fibers, aramid fibers, Kevlar fibers, fibers made from natural materials, and fibers made from nanoparticles. Suitable polymeric material can be thermoplastic or thermoset and includes, for example, polyester and epoxy. Typically, at least one of the fibers will be coated with or embedded in, at least in part, the polymeric material. A particular example includes fiber-reinforced composite materials, such as reinforced fiberglass composites, which are particularly suitable for wind blade construction. Fiber reinforced polymers, such as plastics, are also within the scope of "composites" as that term is used herein. A composite substrate according to the present invention may have one continuous surface, two or more surfaces such as two opposing surfaces, or any other configuration. In a particular embodiment, the substrate is a composite in the form of a wind blade.

The coating system may be applied to at least a part of a composite, for example, to the leading edge of the wind blade.

Before depositing any coating compositions upon the surface of the composite, it is typically desired to remove foreign matter from the surface by thoroughly cleaning and, if necessary, degreasing the surface. Such cleaning typically takes place after forming the substrate (by molding, for example) into an end-use shape. The surface of the substrate can be cleaned by physical or chemical means, or both, such as mechanically abrading the surface (e.g. abrasive blast cleaning) or cleaning/degreasing with commercially available alkaline or acidic cleaning agents are well known to those skilled in the art, such as sodium metasilicate and sodium hydroxide.

Following the cleaning step, the substrate may be rinsed with deionized water or an aqueous solution of rinsing agents in order to remove any residue. The substrate can be air dried, for example, by using an air knife, by flashing off the water by brief exposure of the substrate to a high temperature or by passing the substrate between squeegee rolls. In order to optimize surface readiness (smoothness), putty/filler may be applied to fill surface defects. Putty compositions known to be useful in the fields of aerospace and automotive substrate preparation or repair and coatings are suitable for use. Putty is typically applied by hand with a blade and sanded to achieve an acceptably smooth surface. An air knife can also be used to remove the residue from sanding.

One advantage of the coating composition of the present invention is that it is suitable for use as both a primer coating and as a top coat. This means that only one layer of the coating composition is required for coating the wind blade.

Advantageously, the coating composition is capable of being applied at a dry film thickness from about 100 μm to about 300 μm in just one coat. A reduction in the number coating layers leads to less time required to carry out maintenance of the wind blade, and no problems with the compatibility of the wind blade coating of the present invention with any other coating layers.

The viscosity of the coating composition ready to be applied should be suitable for application using standard application techniques. For example, the viscosity of the coating composition ready to be applied is preferably between 0.1-10 poise at 25° C., as measured in accordance with ASTM D4287.

The coating composition of the present invention may also be used in a method for repairing a wind blade. The method for repairing a wind blade would comprise a step of applying the coating composition of the present application to at least a portion of the wind blade. The coating can be applied to substantially all of the wind blade, or just to a portion of the wind blade, such as the leading edge of the wind blade. In certain embodiments, one or more of the coating layers can be applied to at least a portion of the wind blade. The wind blade repaired in this manner can have a pre-existing coating or coating layers, some or all of which may be removed prior to application of the topcoat. Alternatively, the newly added topcoat could be painted over the existing coating and would be a "second" topcoat. In this embodiment, a tie coat or other adhesion-promoting layer may be applied to the existing coating.

(ix) Other Applications

The coating compositions disclosed herein are particularly suitable for use on wind blades to protect against rain erosion, however they can also be used to protect wind blades and other substrates against solid particle erosion. Examples of other applications include use in the mining and building industry, and as an OEM (original equipment manufacturer) finish coating over earth moving equipments.

The present invention therefore relates to the use of the coating composition disclosed herein for coating substrates, especially when there is a need to protect against erosion, for example water/rain erosion and solid particle erosion.

Substrates include materials such as metal, concrete and plastics, or these materials already coated or partially coated with a paint or filler. A paint may be, for example, a coating of the present invention or a different coating comprising polyurea (e.g. aromatic or aliphatic polyaspartic resins), polyurethane or an epoxy based resin. Advantageously, the coating composition may be applied directly to the above-noted materials.

The invention also relates to these substrates coated with the coating composition of the present invention.

EXAMPLES

The following examples are intended to illustrate various embodiments of the invention, and should not be construed as limiting the invention in any way.

Example 1 and Example 2 coating compositions were prepared by mixing together the components 1 to 9 in Table 1 using a high speed disperser and bead mill. Components 1 to 7 were mixed together first, followed by the addition of pre-mixed components 8 and 9. The stoichiometric ratio of isocyanate groups:secondary amine groups was 1.8:1.

TABLE 1

Values in Table 1 correspond to amounts of each component by % by weight

| | Component | Example 1 | Comparative Example 2 |
|---|---|---|---|
| 1 | Desmophen ® NH1420 | 17 | 17 |
| 2 | TiO$_2$ | 8.5 | 8.5 |
| 3 (for Example 1) | Deuteron ® MK | 10.5 | 0 |
| 3 (for Example 2) | Talc (hydrated magnesium silicate) | 0 | 10.5 |
| 4 | Sodium aluminosilicate powder | 10 | 10 |
| 5 | Additives: Ceraflour ® 996; BYK-077, BYK-066N, Tego ® Airex 900; BYK-307; Tinuvin 292 | 3 | 3 |
| 6 | Methyl N-amyl ketone | 9 | 9 |
| 7 | 1-methoxy-2-propyl acetate | 10 | 10 |
| 8 | Methyl N-amyl ketone | 1 | 1 |
| 9 | Desmophen ® N3800 | 31 | 31 |

Desmophen® NH1420 (ex Bayer Material Science AG)—Polyaspartic ester amine;

Deuteron® MK, amino resin based polymer particles ex Deuteron

Ceraflour® 996 ex BYK-Chemie GmBH—micronized polyethylene wax/PTFE mixture;

BYK-077 ex BYK-Chemie GmBH—methylalkylpolysiloxane;

BYK-066N ex BYK-Chemie GmBH—isobutyl ketone polysiloxane;

Tego® Airex 900 ex Evonik Industries AG—organo-modified polysiloxane;

BYK-307 ex BYK-Chemie GmBH—polyester modified siloxane;

Tinuvin 292 ex BASF Resins—liquid hindered amine light stabilizer;

Desmophen® N3800—solvent free aliphatic polyisocyanate based on a HDI trimer and having an NCO content of 11.0.

All the components used to formulate Example 1 and comparative Example 2 were the same except the amino resin based polymer particles in Example 1 was replaced with talc (hydrated magnesium silicate), a conventional filler material, in Example 2.

Like Example 1, the stoichiometric ratio of isocyanate groups:secondary amine groups in Examples 2 and 3 was 1.8:1.

Testing of Coatings

The coating composition of each Example was applied to an aerofoil shaped mould made from glass reinforced epoxy composite substrate at a dry film thickness of 200 μm by spray application technique and allowed to cure at 27° C. The test coatings were then kept for 21 days maturation for complete film properties development.

For each coating, the rain erosion resistance was determined in accordance with ASTM G73-10. This test involves attaching test specimens to a rotating arm, such that in their circular path it repeatedly passes through and impacts against a water spray. It's an accelerated test methodology where the resistance of the specimen to multiple water droplets impact at very high velocity is tested. Coatings which show good performance in this accelerated test are expected to have good durability in field.

Parameters of Test:

| Duration of test | 3 hours |
|---|---|
| Length of blade | 22 cm |
| Velocity at root of blade | 126 m/sec |
| Velocity at centre of blade | 143 m/sec |
| Velocity at tip of blade | 160 m/sec |
| Rain | 30-33 mm/hour |
| Droplet size | 1-2 mm |
| Temperature | 20-25° C. |

Evaluation of resistance to rain erosion was based on the amount of visual damage to the coating due to the repeated multiple impact of the rain drops. The coatings were visually assessed every 30 minutes for 3 hours. For all coatings, the first damage was at the tip of the blade where the velocity was greatest. During the tests, damage to the coating was also found to occur progressively up towards the root of the blade. The coating having a greater resistance to rain erosion has a shorter length of damaged area, compared to a coating having a lower resistance to rain erosion.

The results of the rain erosion testing are shown in Table 2.

TABLE 2

Values in Table 2 correspond to length of damaged area on blade/cm

| Time (hr) | Example 1 | Comparative Example 2 |
|---|---|---|
| 0.5 | 5 | 16 |
| 1.0 | 13 | 22* |
| 1.5 | 16 | 22* |

TABLE 2-continued

Values in Table 2 correspond to length of damaged area on blade/cm

| Time (hr) | Example 1 | Comparative Example 2 |
|---|---|---|
| 2.0 | 20 | 22* |
| 2.5 | 22* | 22* |
| 3.0 | 22* | 22* |

*maximum possible length of damage was 22 cm.

The coating of comparative Example 2 was damaged along the entire length of the blade after just 1 hour. The coating of Example 1, however, had excellent resistance to rain erosion. It took 2.5 hours (2.5 times as long) for the coating of Example 1 to be damaged along the entire length of the blade. The coating of Example 1 had superior rain erosion resistance when compared to the comparative coating of Example 2.

The time for the coatings to hard-dry having a DFT of 200 microns was measured by BK dry track recorder (ASTM D 5895), with the modification that the temperature/humidity was 27° C., RH-78%. The coatings had a hard-dry time of 130 minutes. As a comparison, the hard-dry time of a leading commercial polyester-based polyurethane product for coating wind blades was measured using the same test. The dry time of the leading commercial polyester-based polyurethane product was found to be 180 minutes.

The Volatile Organic Content (VOC) of the coating composition 1 and comparative coating composition 2 was determined in accordance with EPA Federal Reference Method 24. The VOC of both coating compositions was less than 250 g/L. This is considerably less than the leading commercial polyester-based polyurethane product for coating wind blades, which was determined to be 420 g/L.

The invention claimed is:

1. A coating composition comprising:
   a) 5-30 weight % of a polyaspartic acid ester amine film forming resin comprising secondary amine groups,
   b) 20-50 weight % of a polyisocyanate curing agent,
   c) 5-20 weight % of solid particles of a crosslinked amino resin based polymer,
   d) 15-30 weight % of one or more pigments and/or extender pigments, and
   e) 10-30 weight % of one or more organic solvents,
   and which coating composition is curable in the range of 0 to 30° C.

2. The coating composition according to claim 1 wherein (a) and (b) are present in the coating composition in an amount so that the stoichiometric ratio of isocyanate groups: secondary amine groups is 1.0:1.0 to 2.5:1.0.

3. The coating composition according to claim 1, wherein the amino resin based polymer is a methyl urea based polymer.

4. The coating composition according to claim 1 wherein the polyisocyanate curing agent has an isocyanate equivalent weight of between 280 g/eq to 840 g/eq.

5. The coating composition according to claim 1 wherein the film forming resin comprising secondary amine groups has an amine equivalent weight of between 150 g/eq and 450 g/eq.

6. The coating composition of claim 1 wherein (a) and (b) are present in the coating composition in an amount so that the stoichiometric ratio of isocyanate groups:secondary amine groups is greater than 1.5:1.0 to a maximum ratio of 2.5:1.0.

7. The coating composition of claim 1 wherein the polyaspartic ester amine has the following structure:

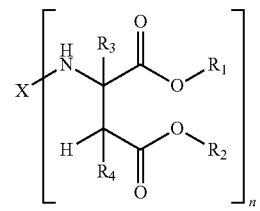

wherein X represents an alicyclic hydrocarbon which is inert towards isocyanate groups at temperatures of up to 100° C.;

$R_1$ and $R_2$ are each independently selected from organic groups which are inert toward isocyanate groups at temperatures of up to 100° C.;

$R_3$ and $R_4$ each are independently selected from hydrogen and organic groups which are inert towards isocyanate groups at temperatures of up to 100° C.; and n is an integer of at least 2.

8. The coating composition of claim 1, wherein the coating composition is provided in two packs, a first pack comprising the polyaspartic ester amine and a second pack comprising the polyisocyanate curing agent.

9. The coating composition according to claim 1 wherein the polyisocyanate curing agent has an isocyanate equivalent weight of between 280 g/eq to 500 g/eq.

10. A method of protecting a substrate against rain erosion or solid particle erosion by
    providing a coating composition comprising a polyaspartic acid ester amine film forming resin comprising secondary amine groups, a polyisocyanate curing agent and solid particles of a crosslinked amino resin based polymer as defined in claim 1,
    applying the coating composition to the substrate to form one or more coating layer(s) on the substrate, and
    allowing the coating layer(s) to harden on the substrate at ambient temperature in the range of 0 to 30° C.

11. The method of claim 10, wherein the substrate is a wind blade or a part thereof.

12. A coated wind blade or a part thereof, comprising a wind blade or part thereof and a coating formed of the coating composition according to claim 1.

* * * * *